(12) United States Patent
Vlaar

(10) Patent No.: US 11,002,402 B2
(45) Date of Patent: May 11, 2021

(54) MONITOR ARM STAND INCLUDING A COUPLING PIECE, AND COUPLING PIECE FOR SUCH MONITOR ARM STAND

(71) Applicant: Vlaar Innovations B.V., Midwoud (NL)

(72) Inventor: Erik Jacobus Vlaar, Midwoud (NL)

(73) Assignee: VLAAR INNOVATIONS B.V., Midwoud (NL)

( * ) Notice: Subject to any disclaimer, the term of this patent is extended or adjusted under 35 U.S.C. 154(b) by 23 days.

(21) Appl. No.: 15/776,849

(22) PCT Filed: Nov. 17, 2016

(86) PCT No.: PCT/NL2016/050798
§ 371 (c)(1),
(2) Date: May 17, 2018

(87) PCT Pub. No.: WO2017/086783
PCT Pub. Date: May 26, 2017

(65) Prior Publication Data
US 2018/0372261 A1    Dec. 27, 2018

(30) Foreign Application Priority Data
Nov. 19, 2015   (NL) ...................................... 2015811

(51) Int. Cl.
*F16M 11/00*    (2006.01)
*F16M 11/08*    (2006.01)
(Continued)

(52) U.S. Cl.
CPC ......... *F16M 11/08* (2013.01); *F16M 11/2014* (2013.01); *F16M 11/22* (2013.01);
(Continued)

(58) Field of Classification Search
CPC ...... F16M 11/08; F16M 11/22; F16M 11/045; F16M 11/24; F16M 11/2014; F16M 13/02
(Continued)

(56) References Cited

U.S. PATENT DOCUMENTS 2,290,410 A   7/1942   Dawson
6,505,988 B1  1/2003   Oddsen
(Continued)

FOREIGN PATENT DOCUMENTS

CN   204 534 033 U   8/2015
DE      39 04 740    8/1990
(Continued)

OTHER PUBLICATIONS

International Search Report from PCT/US06/07993 dated Oct. 4, 2007.
(Continued)

*Primary Examiner* — Steven M Marsh
(74) *Attorney, Agent, or Firm* — Adsero IP

(57) ABSTRACT

A monitor arm stand, comprising a post that extends along a longitudinal axis, a monitor arm for supporting a monitor radially outward relative to the longitudinal axis of the post, and a coupling piece with which the monitor arm in use is swivably coupled to the post at a set position on the longitudinal axis. The coupling piece is provided with a post interface that in use rotationally fixedly engages the post, and with a monitor arm interface that in use bearing mounts the monitor arm to turn on the longitudinal axis of the post at the set position. The disclosure further relates to a coupling piece for such monitor arm stand, to a kit of parts for a monitor stand or coupling piece, and to a method of coupling a monitor arm to a post.

18 Claims, 12 Drawing Sheets

(51) Int. Cl.
*F16M 11/20* (2006.01)
*F16M 11/24* (2006.01)
*F16M 11/22* (2006.01)
*F16M 13/02* (2006.01)
*G06F 1/16* (2006.01)

(52) U.S. Cl.
CPC .......... *F16M 11/24* (2013.01); *F16M 13/022* (2013.01); *G06F 1/1601* (2013.01); *F16M 2200/022* (2013.01); *F16M 2200/066* (2013.01); *G06F 2200/1612* (2013.01)

(58) Field of Classification Search
USPC ...... 248/125.1, 917, 919, 920, 276.1, 282.1, 248/282.11
See application file for complete search history.

(56) References Cited

U.S. PATENT DOCUMENTS

| | | | |
|---|---|---|---|
| 6,726,167 B2 | 4/2004 | Oddsen | |
| 6,854,698 B2 | 2/2005 | Oddsen | |
| 7,246,780 B2 | 7/2007 | Oddsen | |
| 8,720,845 B2* | 5/2014 | Courbon | B60R 1/0612 16/343 |
| 9,746,128 B2* | 8/2017 | Huang | F16M 11/2014 |
| 2006/0202091 A1 | 9/2006 | Oddsen | |
| 2006/0261228 A1* | 11/2006 | Hung | F16M 11/10 248/282.1 |
| 2007/0102607 A1* | 5/2007 | Koh | F16M 11/10 248/276.1 |
| 2011/0233351 A1 | 9/2011 | Foster | |
| 2011/0315843 A1* | 12/2011 | Hung | F16M 11/2092 248/279.1 |
| 2013/0094147 A1 | 4/2013 | Shin | |

FOREIGN PATENT DOCUMENTS

| | | |
|---|---|---|
| DE | 42 38 085 | 5/1994 |
| EP | 2 402 619 | 1/2012 |
| EP | 2402619 | 1/2012 |
| GB | 2 441 108 | 2/2008 |
| WO | WO 2006/096669 | 9/2006 |

OTHER PUBLICATIONS

International Search Report from PCT/NL2016/050798 dated Feb. 17, 2017.

* cited by examiner

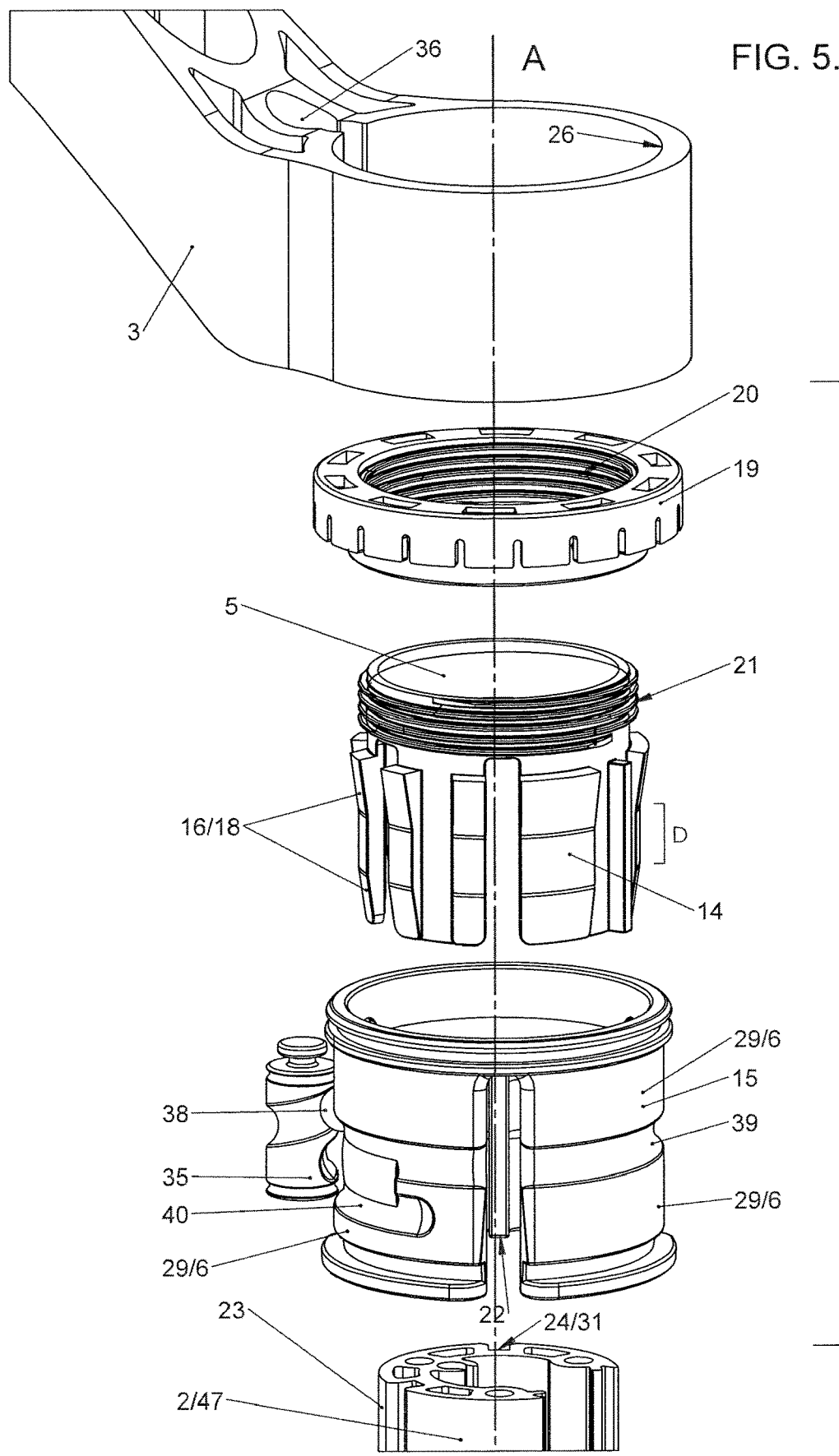
FIG. 5.1

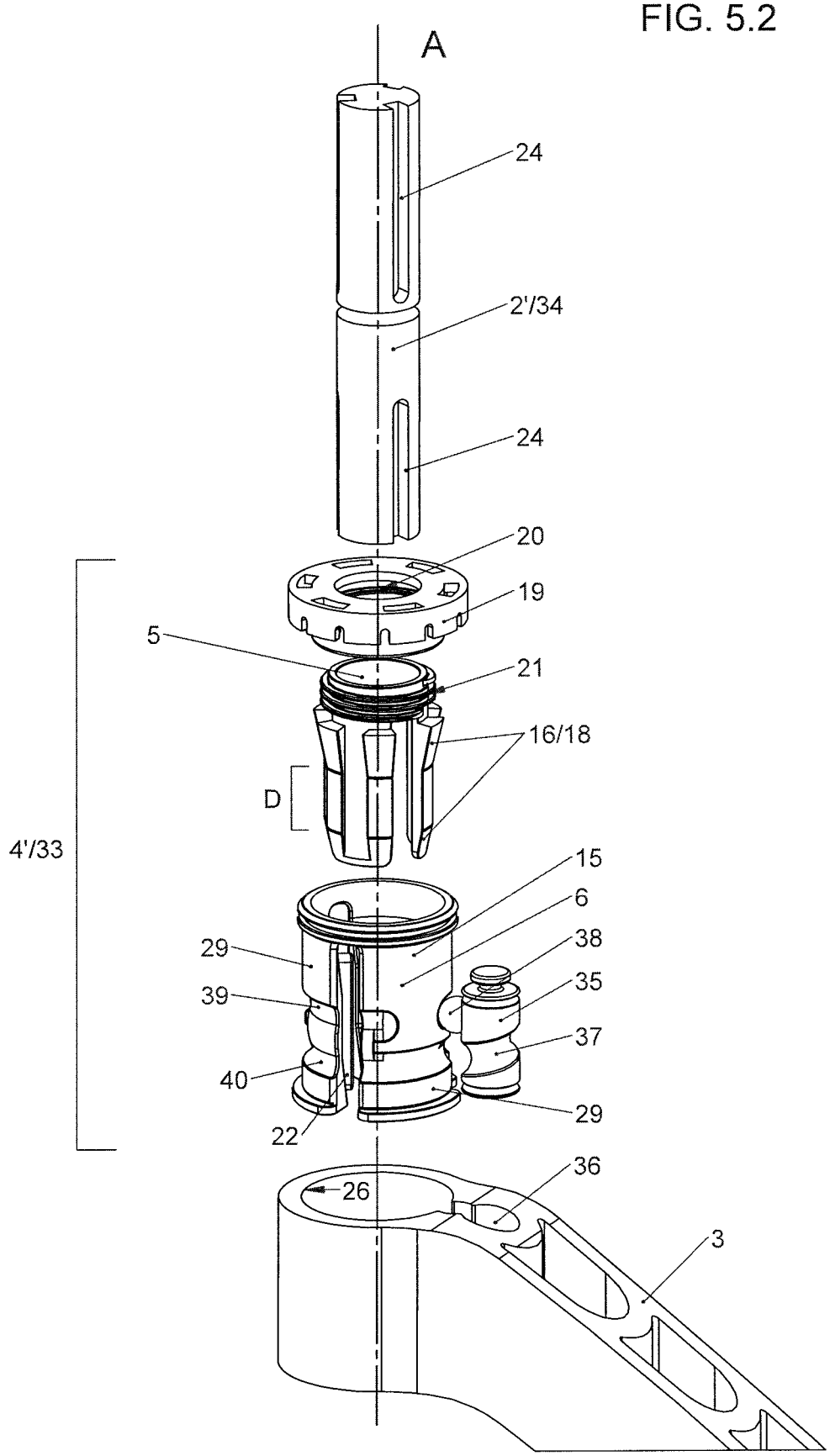
FIG. 5.2

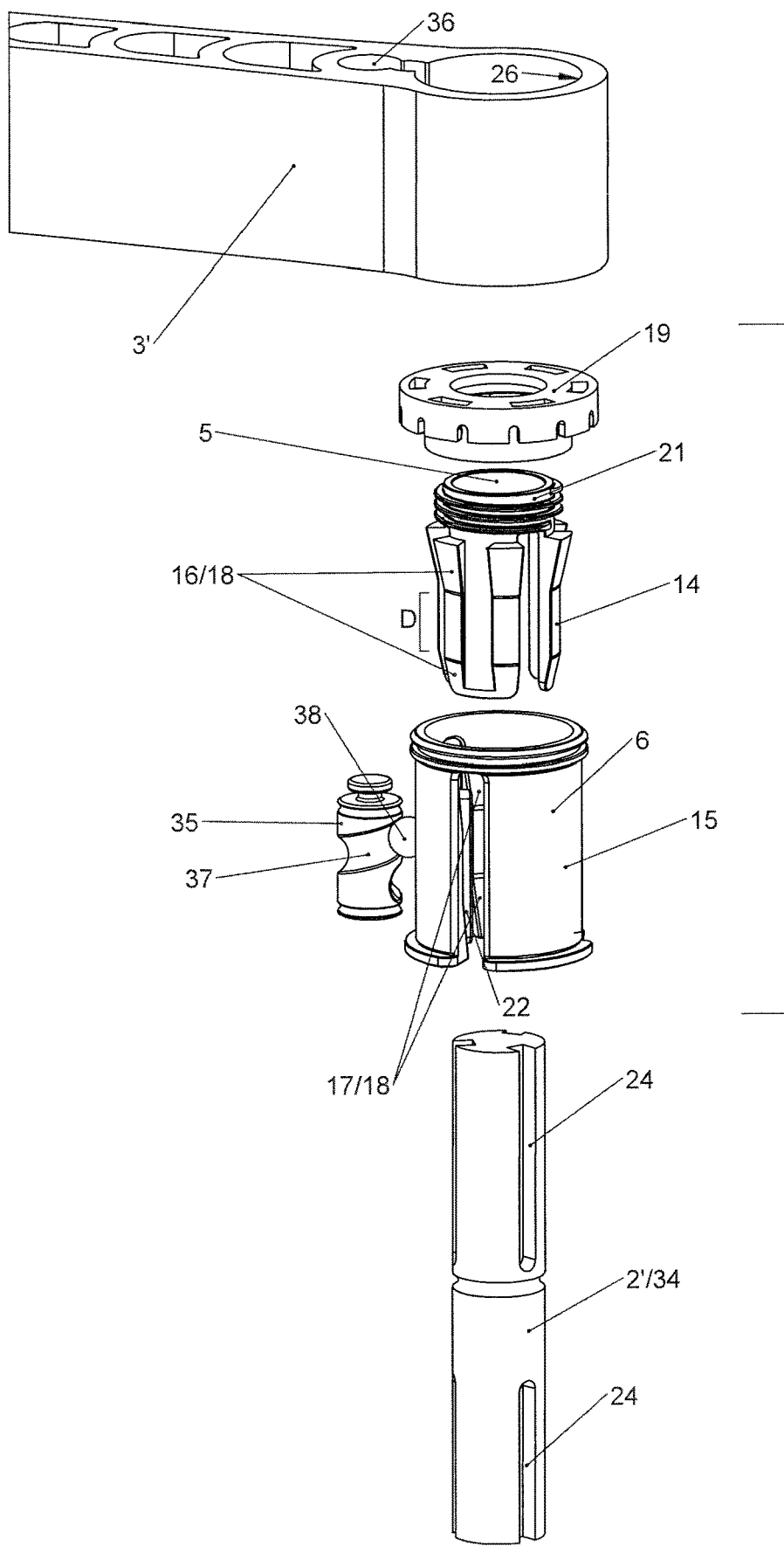
FIG. 5.3

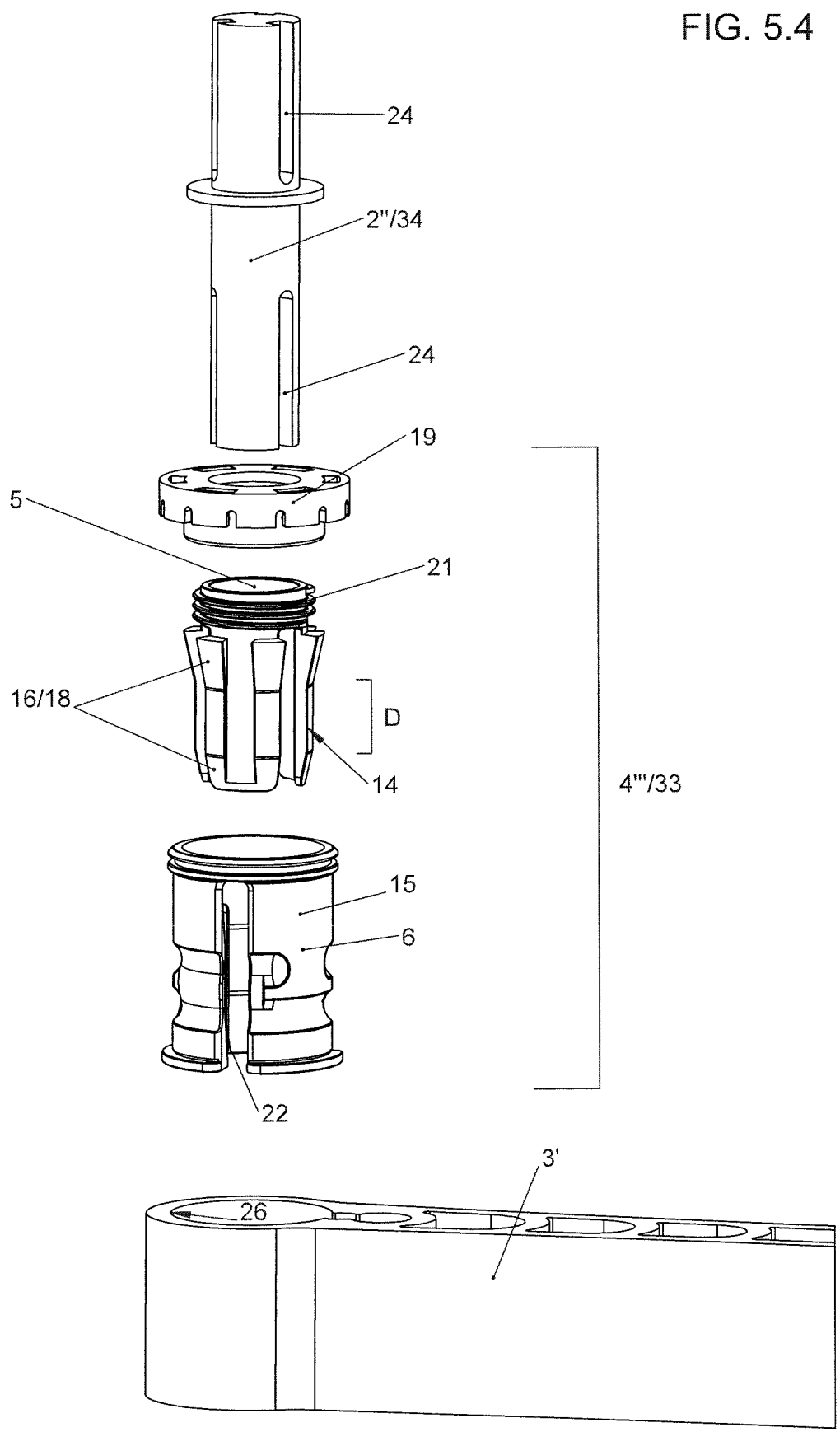
FIG. 5.4

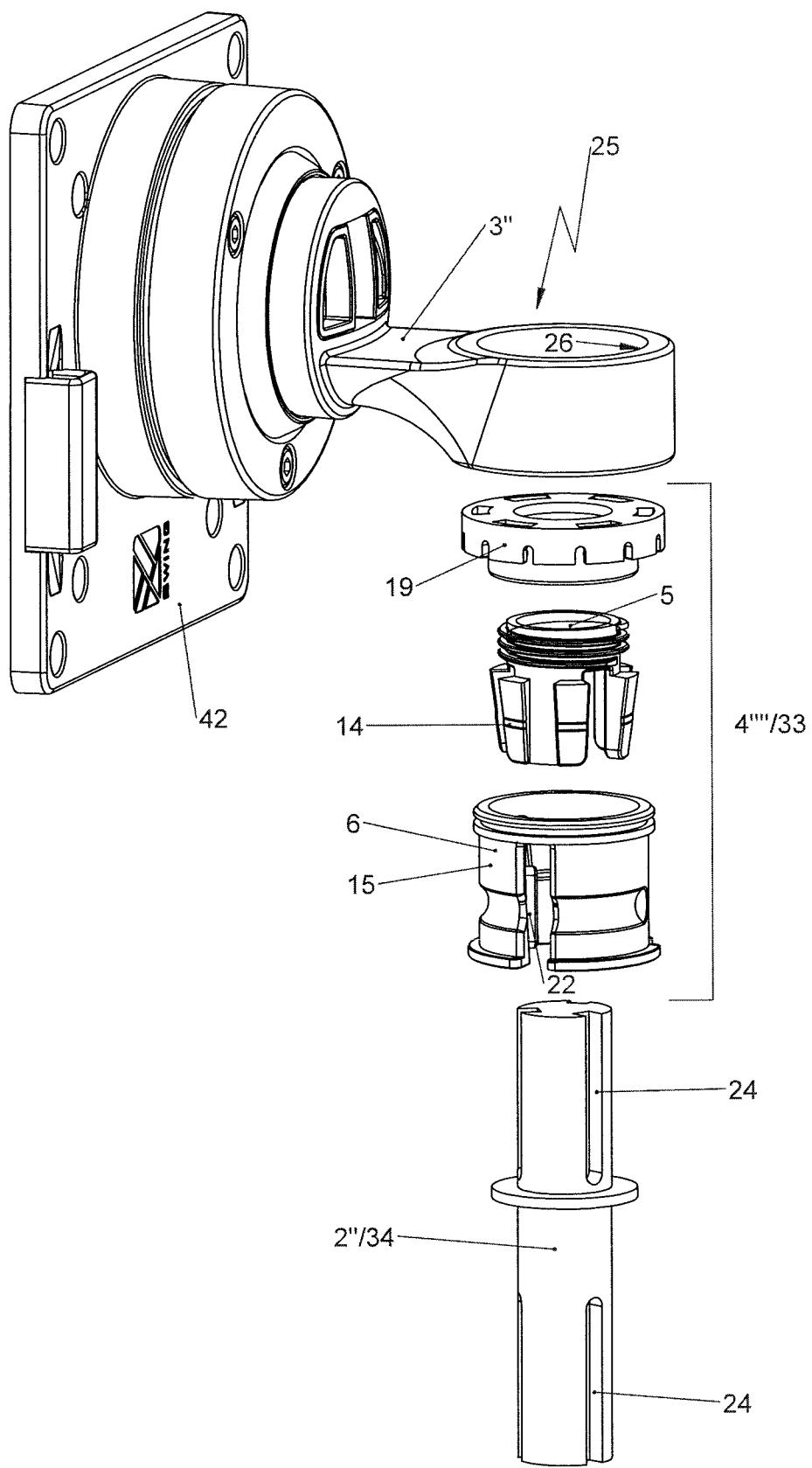
FIG. 5.5

MONITOR ARM STAND INCLUDING A COUPLING PIECE, AND COUPLING PIECE FOR SUCH MONITOR ARM STAND

RELATED APPLICATIONS

This application is a 35 U.S.C. § 371 national phase application of PCT/NL2016/050798 (WO2017/086783), filed on Nov. 17, 2016, entitled "Monitor Arm Stand Including a Coupling Piece, and Coupling Piece for Such Monitor Arm Stand", which application claims priority to Netherland Application No. 2015811, filed Nov. 19, 2015, which is incorporated herein by reference in its entirety.

The invention generally relates to monitor arm stands. Monitor arm stands are well known, and are used to position computer display monitors, typically flat panel displays, at a work space, such as a desk, at a desired viewing position. Typically, a monitor arm stand comprises a post that extends along a longitudinal axis, a monitor arm for supporting a monitor radially outward relative to the longitudinal axis of the post, and a coupling piece with which the monitor arm in use is swivably coupled to the post at a set position on the longitudinal axis.

A first post may be embodied as a main column that is supported by the desk, and may include a mounting track so that, in addition to a swivel angle of the monitor arm, the position of the arm on the longitudinal axis of the post may be set to position the monitor at a desired height and depth relative to an edge of the desk. In basic work spaces where only a single monitor is provided, a monitor arm stand may be used to support only a single display monitor. However, in more complex work spaces, there can be desire to use a monitor arm stand to support a plurality of monitors, e.g. monitors for two desks, plural display monitors per desk in a single viewing plane, or even a bank of monitors. Often, an existing monitor stand needs to be reconfigured to carry a different number of monitors.

Monitor arm stands may in practice be fairly complex in their configuration, and may e.g. be articulated in that two monitor arms are swivably connected via a common intermediate post, to increase the reach of the stand or to allow more monitors to be placed in a single viewing plane. Also, the monitor arm stand may have multiple monitor arms, e.g. a single post that is embodied as a main column may carry two or more separate carrying arms. The monitor arms may thus each carry a single monitor, but may also individually carry a plurality of monitors. Also, the monitor arms may jointly carry a plurality of monitors, e.g. via a cross bar, depending on the configuration.

A challenge in monitor arm stands is to prevent the radially extending monitor arm from sagging, especially when the monitor arm carries a plurality of monitors, and/or is articulated. In practice this problem is addressed by using a relatively complex construction, e.g. a plateau that includes machined clamping surfaces that are axially adjustable along the longitudinal axis of the column to a rotationally fixed, set height position, and that carries the monitor arm via a bolt swivel connection. This is relatively costly to manufacture, and in case of reconfiguration involves a relatively complex operation, requiring substitution of parts and/or tools. For example, when the monitor arm stand is reconfigured from a single arm configuration to a dual arm configuration, substitution of the plateau is needed for a plateau that carries dual swivel bolts, and the bolt swivel connections needs to worked on to remove the arm from one plateau and move it to the other.

The invention aims to provide a monitor arm stand that has little sagging of the monitor arm, and that alleviates the above disadvantages. In particular, the invention aims to provide a monitor arm stand that is of relatively simple construction, more in particular that has relatively simple parts and/or parts that are of less costly construction. As an alternative or in addition, the invention aims to provide a monitor arm stand that is relatively easy to reconfigure, and/or that reduces the need for substitution of parts.

Thereto, the invention provides for a monitor arm stand, comprising a post that extends along a longitudinal axis, a monitor arm for supporting a monitor radially outward relative to the longitudinal axis of the post, and a coupling piece with which the monitor arm is in use swivably coupled to the post at a set position on the longitudinal axis, the coupling piece being provided with a post interface that in use rotationally fixedly engages the post, and a monitor arm interface that in use bearing mounts the monitor arm to turn on the longitudinal axis of the post at the set position.

By coupling the monitor arm to the stand via a coupling piece with a post interface that rotationally fixedly engages the post and a monitor arm interface that bearing mounts the monitor arm, in which clamping and bearing-mounting are realized in one coupling piece, yet in separate interfaces, so that a relatively simple yet effective construction with little or no sag may be achieved. By bearing mounting the monitor arm to turn on the longitudinal axis of the post, a platform may be omitted. This simplifies construction of the coupling piece, and facilitates reconfiguration. For example, in case a second monitor arm is needed, it may be simply added to the post.

The set position on the longitudinal axis of the post may be achieved by axial support, e.g. a flange on the post on which the coupling piece rests or a flange on the coupling piece that rests on the post. Rotational fixation of the post interface to the post may e.g. be achieved by screws, form locking or clamping.

By clamping the coupling piece in use between the post and the monitor arm via the post interface and the monitor arm interface respectively, sagging may be prevented further through elimination or reduction of play. The functionality of reducing or eliminating play trough clamping allows the parts to be manufactured less costly, e.g. as die cast or extruded parts without the need for a machining step to reach narrow size and shape tolerances for the interfaces to prevent sagging. The rotationally fixed engagement of the post interface allows the monitor arm interface to in use act as a bearing mount in spite of the clamping via these interfaces. Elegantly, the surface area of the monitor arm interface is chosen relatively small and smooth to reduce friction.

The coupling piece may be operable between a clamping use position in which the monitor arm is clamped onto the post via the coupling piece, and a releasing position in which the monitor arm is not clamped onto the post. This way, mounting of the monitor arm onto the post may be facilitated.

At least a portion of the coupling piece may be moveable along the longitudinal axis of the post relative to the post and/or the monitor arm to adjust the coupling piece between the use position and the releasing position. This way a direction of movement to adjust the coupling piece is provided that is easy to accommodate, and that allows for ease of operation.

The coupling piece may comprise a wedge surface that transposes axial movement of at least a portion of the coupling piece along the longitudinal axis of the post relative to the post and/or monitor arm between the clamping use position and the releasing position into a radial operating movement of the coupling part relative to the post and/or monitor arm. This type of wedge clamping allows for ease of operation and secure clamping with little play, and hence very little sag.

The wedge surface may comprise conical clamping surfaces that in circumferential direction may be continuous, or discontinuous, e.g. interspaced. The latter allows for increased deformation to accommodate play. As an alternative or in addition, the wedge surfaces may in axial direction along the longitudinal axis of the post be continuous or discontinuous, e.g. interspaced. The clamping surfaces may be arranged to taper towards the longitudinal axis, or to extend away therefrom.

Axial movement of the coupling piece or the portion thereof along the longitudinal axis of the post relative to the post and/or monitor arm may e.g. be generated via screw threads, e.g. a threaded ring surrounding the post. Such a threaded ring allows for easy, tool-less operation.

The post may be a column that includes a mounting track of which the length along the longitudinal axis is at least twice the dimension of the post interface in the longitudinal direction of the column. This way, two monitor arms may be mounted on a single post, e.g. an interconnecting post to provide an articulated monitor arm or a single post carrying two separate monitor arms. Also, a single monitor arm may then be adjusted along the mounting track of the post to position the monitor arm at a desired height on the post. It should be noted that, as an alternative, the length of the post along the longitudinal axis may be chosen to be substantially equal to the dimension of the post interface in the longitudinal direction of the post. This way, the mounting arm may be mounted onto the post at a set position that is not height adjustable or only marginally so.

Typically, a first post of the monitor arm stand may be embodied as an upright column, and the monitor arm may extend substantially horizontally. The first post may, however, also be embodied as an upright stud, from which the monitor arm extends not only radially outward but also upward.

It should be noted that a monitor arm stand according to the invention may comprise a coupling piece as claimed as a first coupling piece on the first post. However, a monitor arm stand according to the invention may also include another type of first post or column with a different coupling between the monitor arm and the first post or column. In such case, a post and coupling piece according to the invention may be embodied in an opposite end of the first monitor arm and/or in further monitor arms.

The coupling piece may comprise a coupling bushing arranged between the post and the monitor arm. This allows for a simple and elegant construction. Such coupling bushing may be manufactured from plastics material e.g. through injection molding. The coupling bushing may be a single part, but may also be composed of several parts. A radial inner mantle surface of the coupling bushing may comprise the post interface, and the radial outer mantle surface of the coupling bushing may comprise the monitor arm interface.

The monitor arm interface may be embodied as an one-piece ring with a tapered outer mantle that engages a correspondingly tapered mounting aperture in the monitor arm via relative movement along the longitudinal axis of the post. This allows for a very simple construction. The inner mantle of the ring may then e.g. be substantially cylindrical with radially inwardly extending ridges to rotationally lockingly engage axially extending grooves in the mantle surface of the post.

The coupling bushing may comprise a radially inwardly disposed inner coupling bushing part that comprises the post interface, and a radially outwardly disposed outer coupling bushing part that surrounds the inner coupling bushing part, and that comprises the monitor arm interface. The radial outer face of the inner coupling bushing part and the radial inner face of the outer coupling bushing part may cooperate with each other via wedge surfaces. In such a split coupling bushing, the base form of the radial inner and outer mantles of the coupling bushing may be cylindrical, which facilitates manufacturing of the post and mounting aperture for the coupling bushing in the monitor arm. A screw ring may then be axially fixed and rotatably freely held on one of the coupling bushing parts, and may via a screw thread engage the other coupling bushing part. The coupling bushing parts may preferably be rotationally fixed with respect to each other.

The radial outer face of the inner coupling bushing part and the radial inner face of the outer coupling bushing part may comprise sets of cooperating wedge surfaces that are interspaced along the longitudinal axis of the post. By providing such "staged" wedge surfaces, the inclination of the wedge surface may be chosen relatively strong, so that a relatively large radial movement may be generated in a limited axial stroke space. The axially interspaced wedge surfaces may have the same orientation and the same inclination. However, the inclination of the respective spaced apart wedged surfaces may be stronger for one set of surfaces than for another set, and the inclination of the sets of surfaces may e.g. be mutually opposite. The interspace along the longitudinal axis of the post between the sets of wedge surfaces may be used to embody auxiliary features of the coupling piece, e.g. an adjustable stop that limits swiveling movement of the monitor arm.

The coupling bushing may comprise a radially inwardly extending locking ridge that reaches into a slot in the mantel surface of the post that extends along the longitudinal axis of the post. This way, the coupling piece may be rotationally fixedly coupled to the post in an elegant way. In case of an embodiment of the coupling bushing that comprises an inner and outer coupling bushing part, the inner coupling bushing part may be provided with the radially inwardly extending ridge. However, as an alternative or in addition, the radially outward coupling bushing part may be provided with a locking ridge that projects radially inwardly via the inner coupling bushing part to reach into a slot in the post. The coupling piece, in particular, the coupling bushing, may be manufactured from plastics material so as to increase its ability to absorb play by deformation.

The monitor arm may be provided with a mount, in which the coupling piece is in use held via its monitor arm interface. This way, the coupling piece may reliably be held in an aperture in the monitor arm, e.g. a substantially ring-shaped aperture that in use at least partially surrounds the circumference of the post.

The monitor arm may be embodied as an extruded profile in which the mount is formed by an un-machined extruded aperture. Such profile may e.g. be manufactured from aluminum. In particular when the coupling piece in use clamps between the post and the monitor arm via the post interface and monitor arm interface respectively, more in particular via wedge surfaces, the coupling may during clamping accommodate or absorb the relatively high manufacturing tolerances of a mounting aperture in such an extruded, unmachined profile, without significant sagging of the monitor arm. The mounting aperture in such an extruded profile may typically have a constant cross section, and may e.g. be substantially cylindrical.

The monitor arm may further comprise a second mount on an opposite end of the monitor arm, in which, analogous the first coupling piece, in use a second coupling piece is bearing mounted via its monitor arm interface, and rotationally fixedly engages a second post via its post interface at a set position along its longitudinal axis. This way, a modular build-up may be achieved, which facilitates manufacturing, assembly and operation of the monitor arm stand. The third coupling piece may in use via its monitor arm interface bearing mount a second monitor arm to turn on the longitudinal axis of the second post at further set position. Analogous to the first and second coupling pieces, in use a third coupling piece may rotationally fixedly engage the second post via its post interface at another set position along the longitudinal axis of the second post. This way, an articulated monitor arm may be provided in a simple and elegant manner.

The third coupling piece may in use via its monitor arm interface bearing mount a second monitor arm to turn on the longitudinal axis of the second post at a further set position. In case a first monitor arm is swivably coupled to a column of a monitor stand via a coupling that is not in accordance with the invention, and the first and second monitor arms are coupled as set out above, the second and third coupling pieces are then to be considered the first and second coupling pieces respectively, and the second and third posts are then to be considered the first and second posts respectively.

The monitor arm stand may in use carry a monitor via the opposite end of the first or second monitor arm. Such monitor may be carried directly, or via a coupling piece, which in particular may include a coupling piece and post in accordance with the invention.

The invention further relates to a coupling piece for a monitor arm stand, with which coupling piece a monitor arm in use is swivably coupled to a post of a monitor arm stand at a set position on the longitudinal axis of the post, wherein the coupling piece is provided with a post interface that in use rotationally fixedly engages the post, and a monitor arm interface that in use bearing mounts the monitor arm to turn on the longitudinal axis of the post at the set position.

Advantageously, the coupling piece is then configured to be operable between a clamping use position in which the monitor arm is clamped onto the post via the coupling piece, and a releasing position in which the monitor arm is not clamped onto the post. At least a portion of the coupling piece may be moveable along the longitudinal axis of the post relative to the post and/or the monitor arm to adjust the coupling piece between the use position and the releasing position. The coupling piece may comprise a wedge surface that transposes axial movement of at least a portion of the coupling piece along the longitudinal axis of the post relative to the post and/or the monitor arm between the clamping use position and the releasing position into a radial operating movement of the coupling parts relative to the post and/or monitor arm.

The invention further relates to a kit of parts for a monitor stand, or coupling piece.

In addition, the invention relates to a method of coupling a monitor arm to a post by rotationally fixedly engaging the post with a coupling piece, and bearing mounting the monitor arm on the coupling piece to turn on the longitudinal axis of the post. In the method, the coupling piece may be clamped between the post and the monitor arm.

It should be noted that the technical features described above may each on its own be embodied in a monitor arm stand or coupling piece, i.e. isolated from the context in which it is described here, separate from other features or in combination with only a number of features described in the context in which it is disclosed herein. Each of these features may further be combined with any other feature disclosed, in any combination.

The invention will be further elucidated on the basis of non limitative exemplary embodiments represented in the drawings. In the drawings:

FIG. 1b shows a schematic perspective cross section of a detail of FIG. 1a;

It should be noted that the figures are merely schematic representations of preferred embodiments of invention. In the figures, identical or corresponding parts are represented with the same reference numerals.

Figure 1A:
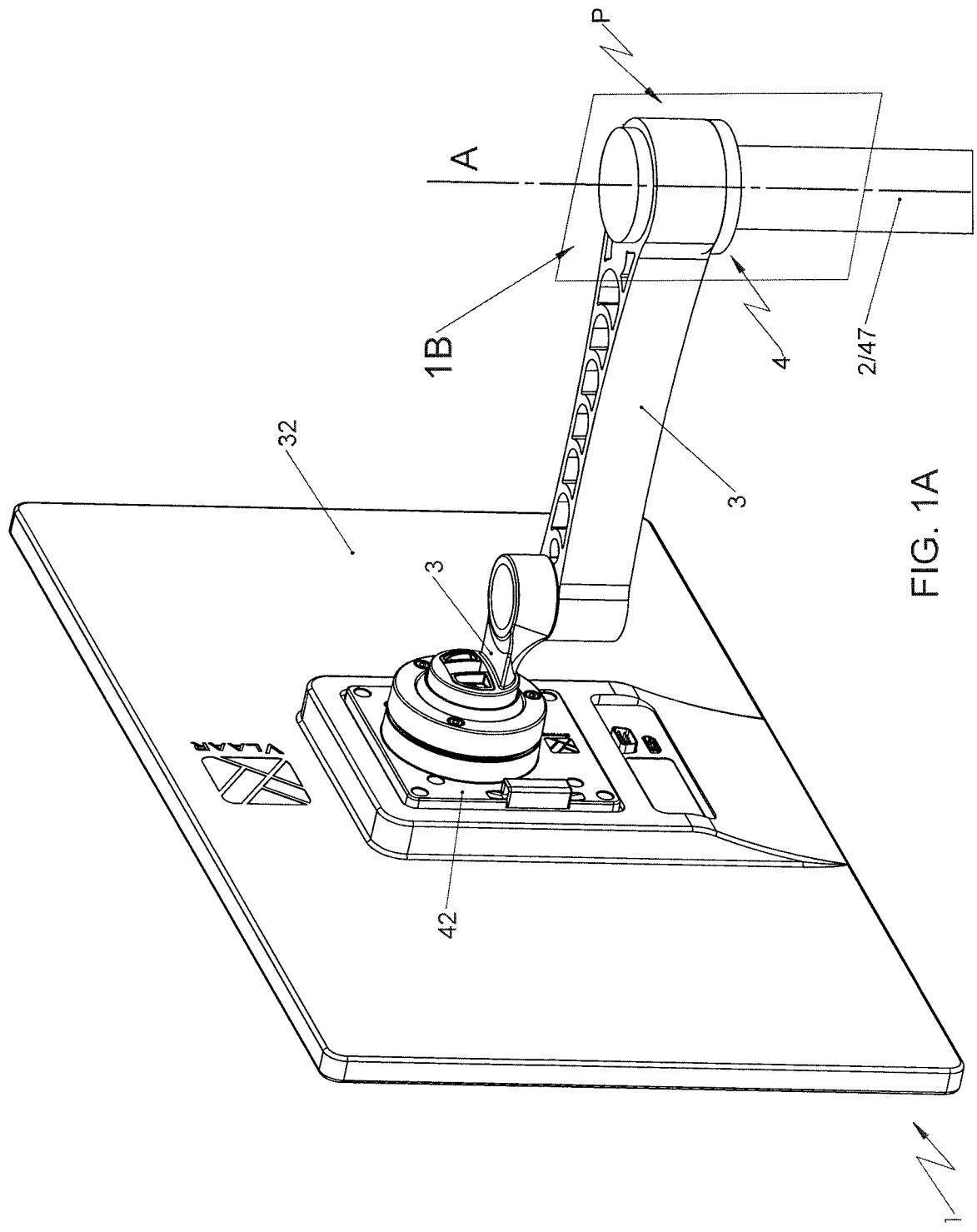
FIG. 1a shows a schematic perspective view section of a first embodiment of a coupling piece coupling a monitor arm to a post of a monitor arm stand.
Figure 1B:
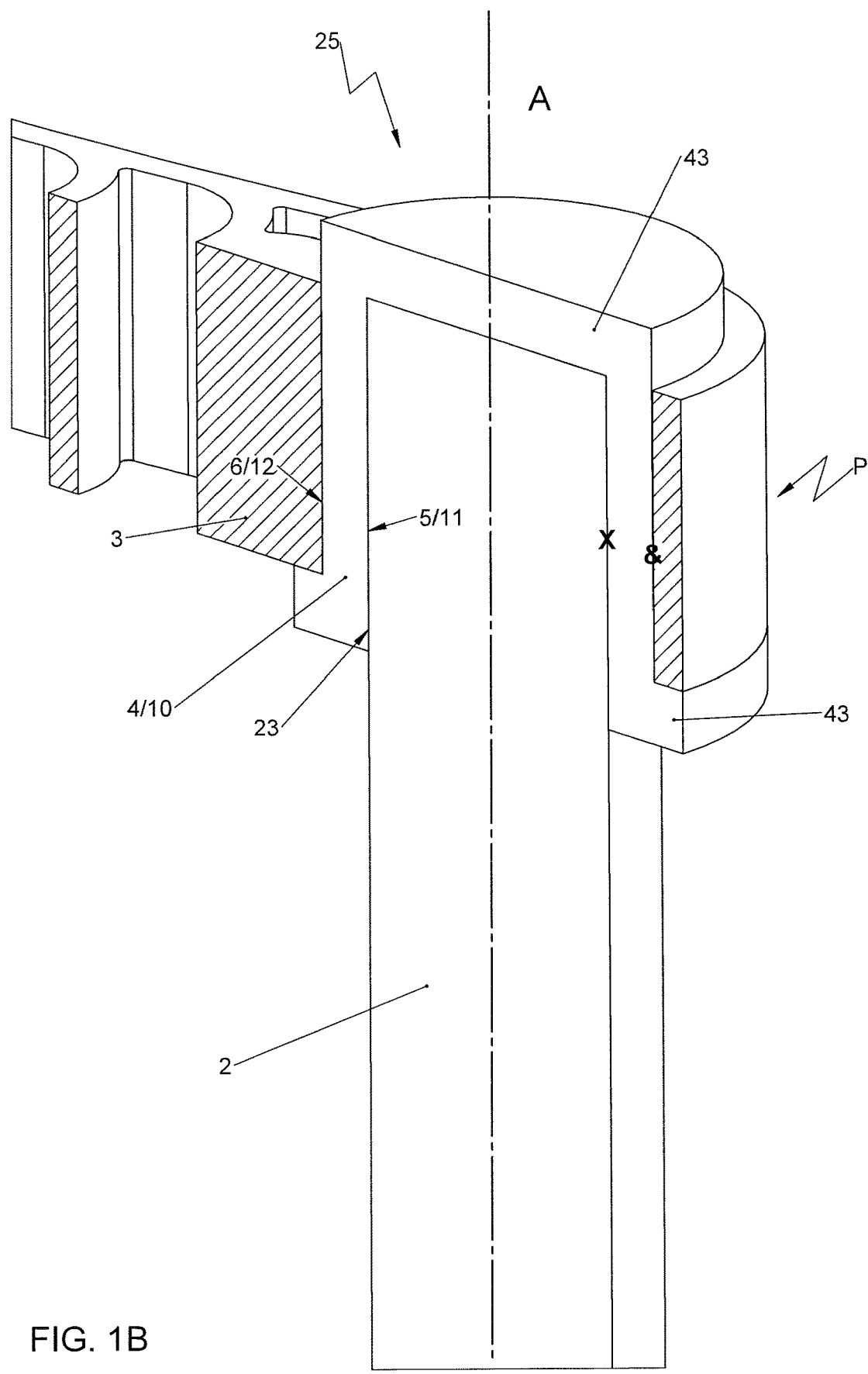

Referring to FIG. 1a and FIG. 1b a monitor arm stand 1 is shown. The monitor arm stand 1 comprises a post 2 that extends along a longitudinal axis A. The monitor arm stand 1 further includes a monitor arm 3 that supports a monitor 32 radially outward relative to the longitudinal axis A of the post 2. The post 2 is embodied as a column 47, of which its bottom end includes a clamping structure for clamping engagement of a desk top of a desk in a work space.

The monitor arm stand 1 further includes a coupling piece 4 with which the monitor arm 3 is swivably coupled to the post 2 at a set position P on the longitudinal axis A. The coupling piece 4 is shown in cross section in detail in FIG. 1b. The coupling piece 4 is provided with a post interface 5 that in use rotationally fixedly engages the mantle surface 23 of the post 2. In the schematic representation of FIG. 1b, the rotationally fixed engagement is indicated with a cross X. In practice this rotationally fixed engagement at the post interface 5 may be achieved using an interference fit, a mechanical connection such as a screw connection, form closure or a clamping connection. In the exemplary embodiment of FIG. 1, the rotationally fixed engagement is achieved by form closure through a radially inwardly extending locking ridge 22 that engages a slot 24 in the post 2 (not shown).

The coupling piece 4 further includes a monitor arm interface 6 that bearing mounts the monitor arm 3 to turn on the longitudinal axis A of the post 2 at the set position P. In the figure, this is indicated with a curl (&). The bearing mount may in practice be achieved by providing a mounting aperture 25 with a bearing surface, for example a cylindrical bearing surface, that has a sliding fit with the coupling piece 4 at the monitor arm interface 6, for example a smooth cylindrical radial outer mantle surface 12 of the coupling piece 4. To facilitate its bearing function, the coupling piece 4 may e.g. be manufactured from a plastics material, while the monitor arm 3 may e.g. be manufactured from metal.

The coupling piece 4 is in this example held at the set position P on the longitudinal axis A via an axial support structure, in particular a flange 43 of the coupling piece 4 that rests on the top of the post 2 (not shown).

As shown in this example, the coupling piece 4 is embodied as an one-piece bushing 10, of which the inner mantle surface 11 carries the post interface 5, and of which the outer mantle surface 12 carries the monitor arm interface 6. In this embodiment, the set position P of the coupling piece 4 on the longitudinal axis A of the post 2 is fixed. Sagging may be prevented or reduced through axial support, rotational fixation and low tolerance fit of the post interface 5 of the busing onto the post 2 at the post interface 5, and the bearing mounting being embodied separately at the monitor arm interface 6 of the bushing.

Figure 2A:
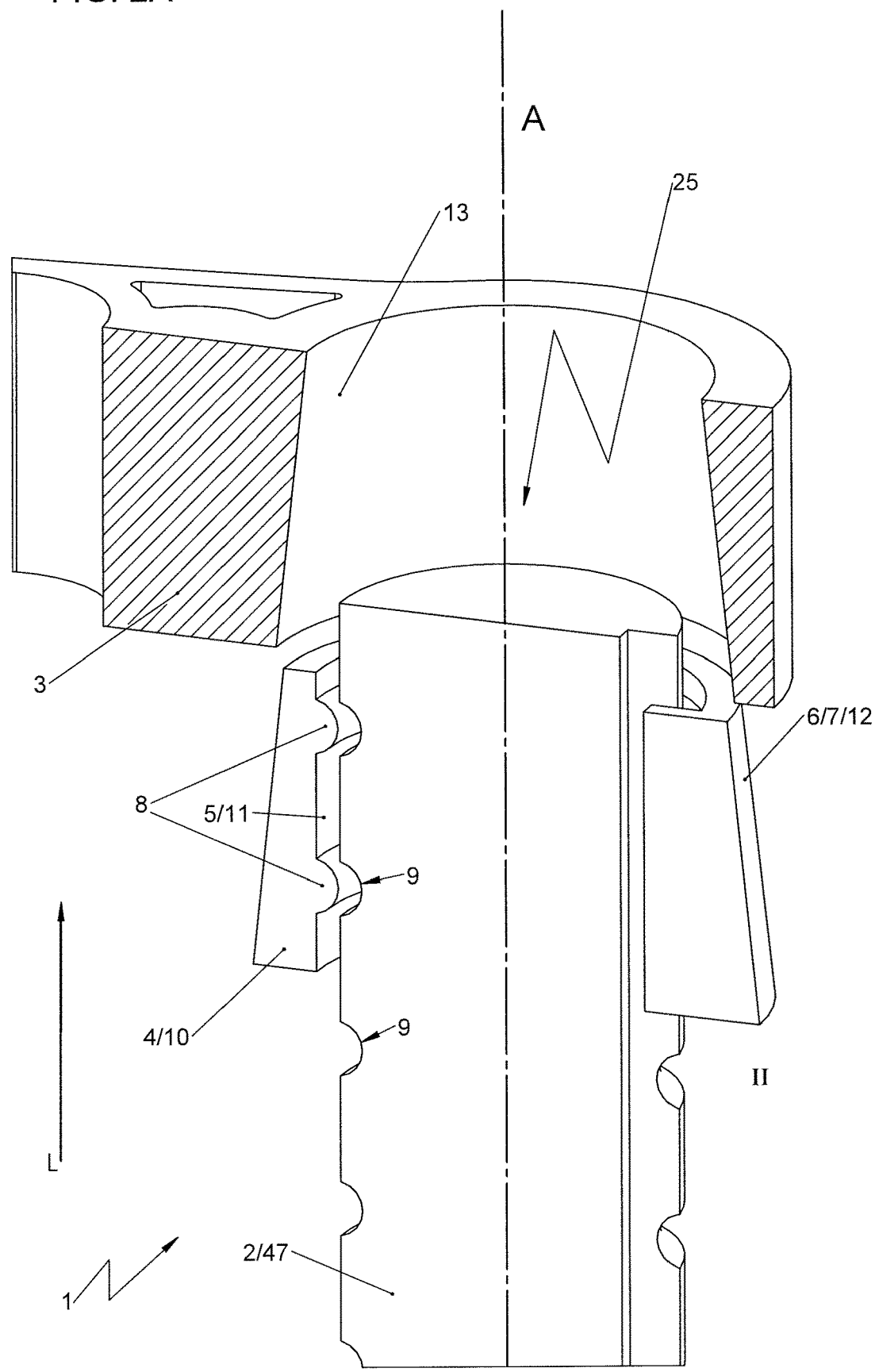
FIG. 2a shows a schematic perspective cross section of a second embodiment of a coupling piece about to couple a monitor arm to a post of a monitor arm stand.
Figure 2B:
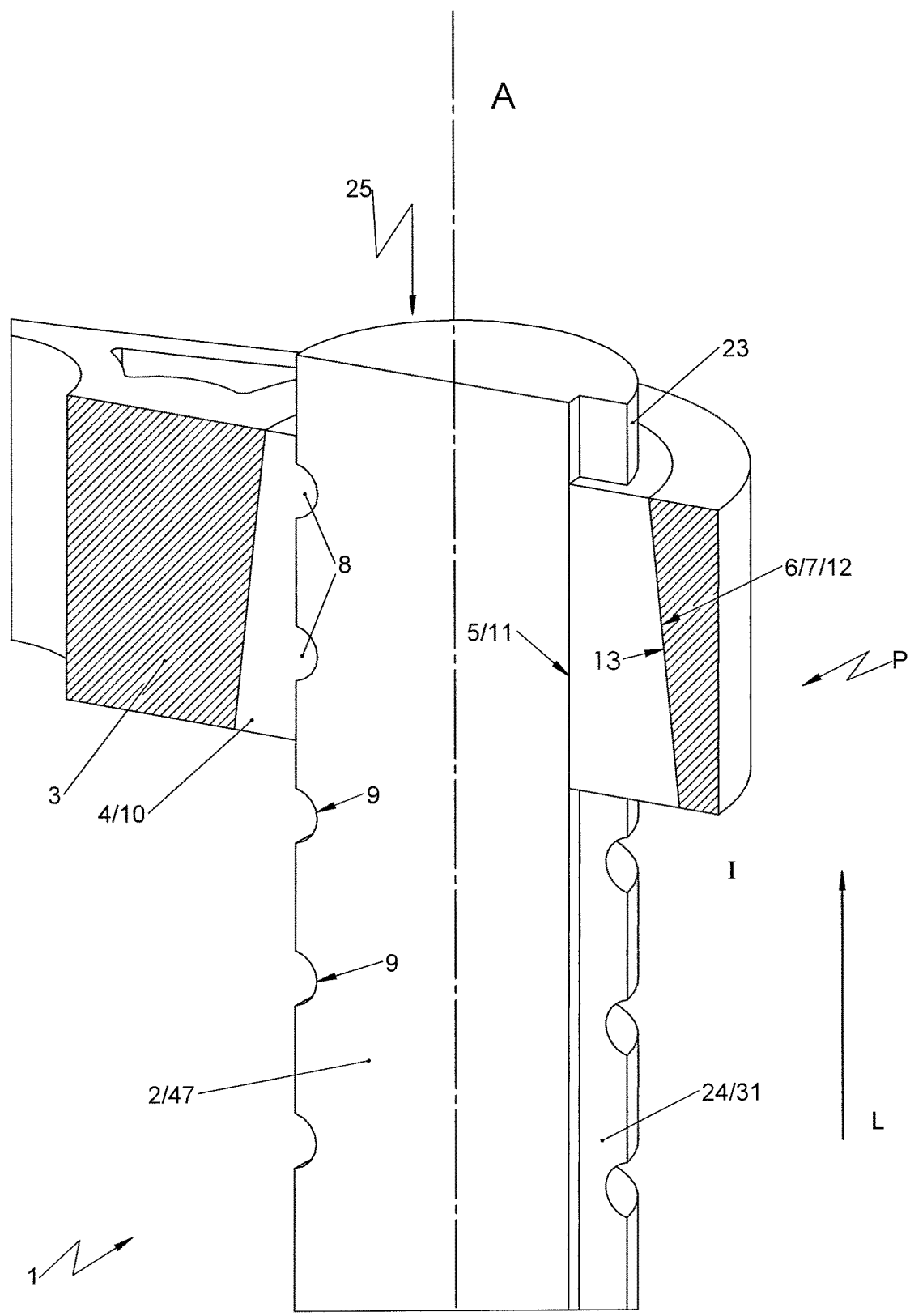
FIG. 2b shows the coupling piece of FIG. 2a clampingly coupling the monitor arm to the post.

Turning to FIGS. 2a and 2b a schematic cross section of a second embodiment of a coupling piece 4 is shown in a release position II in which it is about to couple a monitor arm 3 to a post 2 of a monitor arm stand 1. FIG. 2b shows the coupling piece 4 of FIG. 2a in a clamping use position I, in which it clampingly couples the monitor arm 3 to the post 2. The coupling piece 4 is in this embodiment constructed as a one-piece bushing 10 having a substantially cylindrical inner mantle surface 11 that carries the post interface 5. The inner mantle surface 11 includes radially inwardly extending circumferential projections 8 that engage grooves 9 in the mantle surface 23 of the post 2 to hold the coupling piece 4 at a set position P on the longitudinal axis A of the post 2. When the post 2 is embodied as a column 47 that includes a plurality of grooves 9 as shown, the coupling piece 4 may in use be moved along the length L of a mounting track 31 to be positioned at a position of choice that then can serve as a set position P.

The outer mantle surface 12 is embodied as a conical wedge surface 7. The wedge surface 7 cooperates with a conical wedged bearing surface 13 of a mounting aperture 25 provided in the monitor arm 3. By moving the monitor arm 3 along the longitudinal axis A of the post 2 relative to the coupling piece 4, the coupling piece 4 can be clamped between the post 2 and the monitor arm 3 via the post interface 5 and the monitor arm interface 6 as shown in FIG. 2b. This way sagging may be prevented or reduced further through elimination or reduction of play. Rotational fixed engagement may in particular be obtained using a radial locking ridge 22 that reaches into a slot 24 in the mantle surface 23 of the post 2 that extends along the longitudinal axis A of the post 2. The slot 24 may in particular extend the length L of the mounting track 31 if desired. The wedge surface 7 cooperates through its outer mantle surface 12 with the inner conical wedged bearing surface 13 of the mounting aperture 25 to form a bearing mount.

Figure 3A:
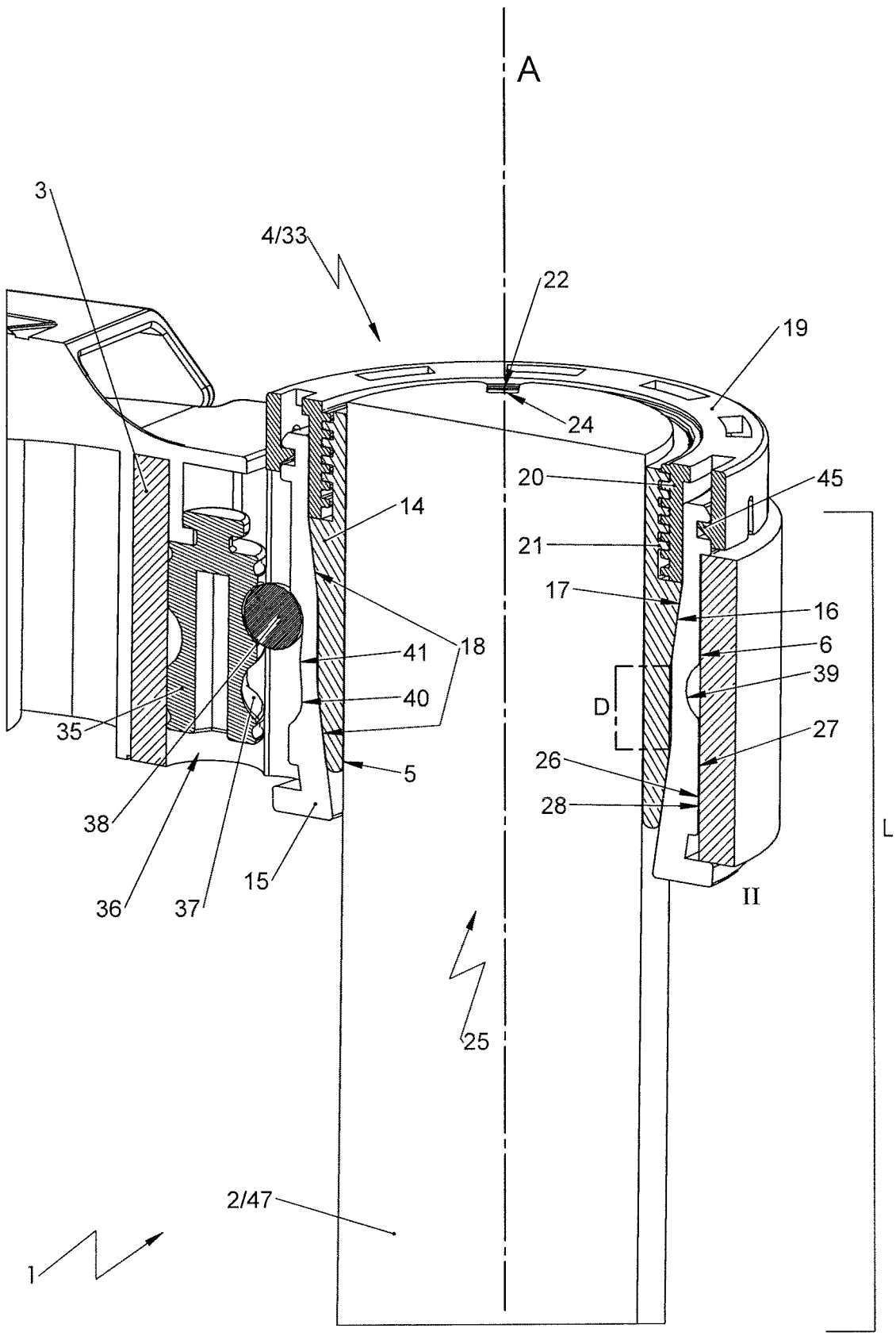
FIG. 3a shows a schematic perspective cross section of a third embodiment of a coupling piece for coupling a monitor arm to a post of a monitor arm stand in a releasing position.
Figure 3B:
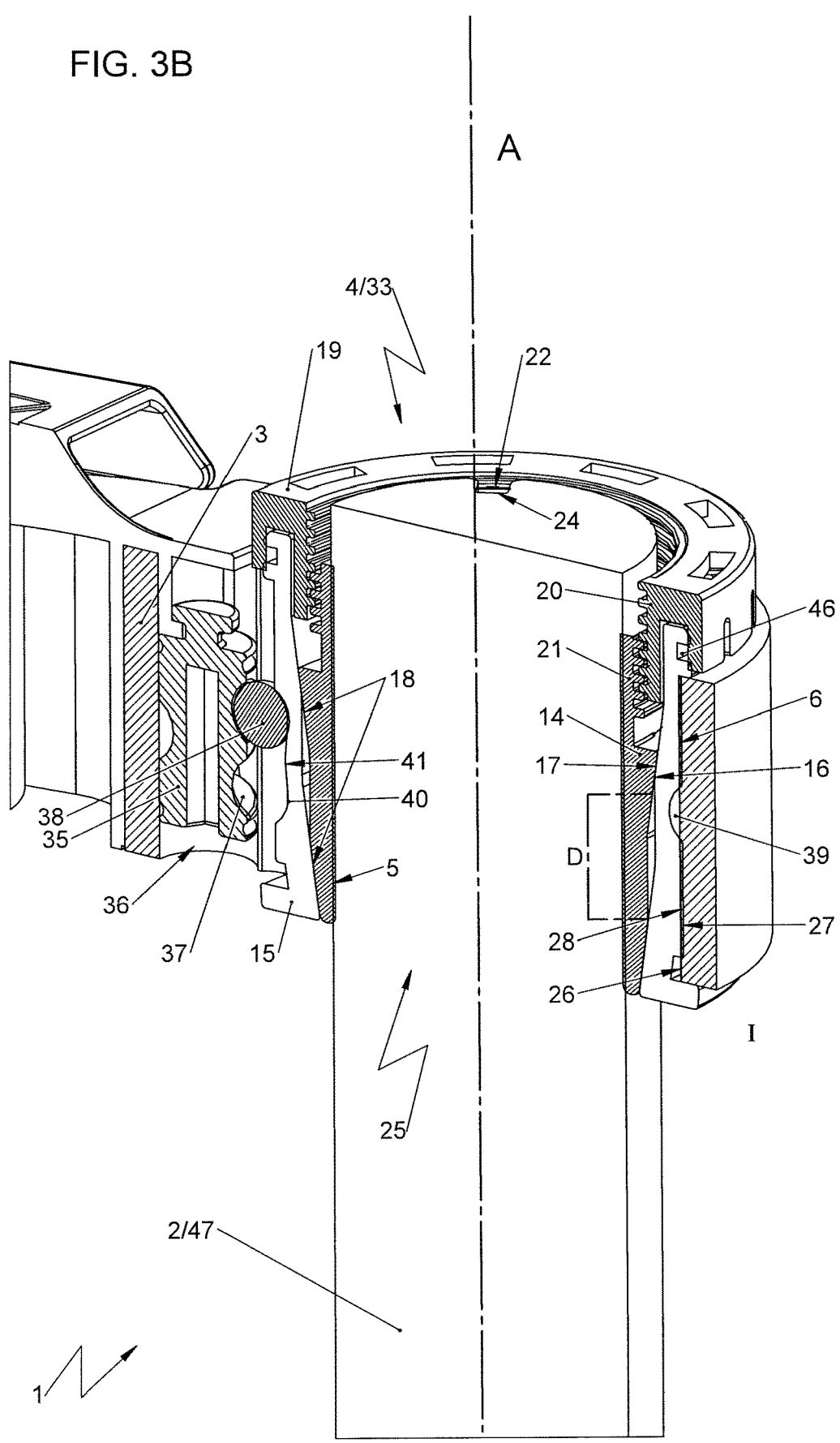
FIG. 3b shows the coupling piece of FIG. 3a in a clamping use position.

Turning to FIGS. 3a and 3b, a schematic cross section of a third embodiment of a coupling piece 4 for coupling a monitor arm 3 to a post 2 of a monitor arm stand 1 is shown. The coupling piece 4 here forms a coupling unit 33. FIG. 3a shows the coupling piece 4 in a releasing position II, while FIG. 3b shows the coupling piece 4 of FIG. 3a in a clamping use position I. In this embodiment, the coupling piece 4 is embodied as a coupling bushing which is composed of several parts. The coupling bushing comprises a radially inwardly disposed inner coupling bushing part 14 that comprises the post interface 5. It also composes a radially outwardly disposed outer coupling bushing part 15 that surrounds the inner coupling bushing part 14, and that comprises the monitor arm interface 6. The radial outer face 16 of the inner coupling bushing part 14 and the radial inner face 17 of the outer coupling bushing part 15 cooperate with each other via wedge surfaces 18. In particular, two sets of interspaced cooperating wedge surfaces 18 are provided that are interspaced by a distance D along the longitudinal axis A of the post 2.

The inner coupling bushing part 14 and the outer coupling bushing part 15 are connected via a screw ring 19. The screw ring 19 is rotationally free but axially fixedly held by a flange 45 that engages a groove 46 at the outer bushing part and includes screw thread 20 on its inner surface. The screw thread 20 cooperates with corresponding screw thread 21 on the radial outer surface of the inner coupling bushing part 14. By rotating the screw ring 19 on the longitudinal axis A of the post 2, the inner coupling bushing part 14 is movable along the longitudinal axis A of the post 2 relative to the outer coupling bushing part 15. The wedge surfaces 18 then transpose axial movement of the inner coupling bushing part 14 along the longitudinal axis A of the post 2 relative to the post 2 into a radial operating movement of the coupling bushing part between the releasing position II and the clamping use position I. The outer coupling bushing part 15 comprises an radially inwardly extending locking ridge 22 that reaches through the inner coupling bushing part 14 into a longitudinally extending slot 24 in the mantle surface 23 of the post 2 that is embodied as a column 47. A cylindrical inner surface 26 of a mounting aperture 25 of the monitor arm 3 cooperates with a radial cylindrical outer surface 27 of the outer coupling bushing part 15 that forms a bearing mounting monitor arm interface 6 to reduce friction. A set of cylindrical contact rings 29 (see FIG. 5.1) have been provided that correspond to the position of the sets of wedge surfaces 18 along the longitudinal axis A. Screwing the screw ring 19 allows the coupling bushing parts to move relative to each other along the longitudinal axis A, and the wedge surfaces 18 transpose this axial movement into radial movement of the coupling bushing parts. The coupling piece can thus be clamped between the post 2 and the monitor arm 3 via the post interface 5 and the monitor arm interface 6 as shown in FIG. 2b. This way sagging may be prevented or reduced further through elimination or reduction of play in a tool-less operation.

The coupling piece 4 further includes a screw 35 that is rotatably held in a recess 36 of the arm 3. The screw 35 includes a helical path 37, which engages a ball 38, e.g. a conventional steel ball as typically used in a ball bearing. The outer coupling bushing part 15 is provided with an upper circumferential groove 39, e.g. that extends about a long arc, e.g. 360 degrees, and a lower circumferential groove 40, e.g. that extends about a short arc, e.g. 180 degrees. The ball 38 may cooperate with either groove 39,40 so as to define a limited angular swivel path of the arm on the post 2 between the ends of each groove. The ball 38 may in a starting angular position be transferred from the long groove 39 to the short groove 40 via an axially extending transfer groove by rotating the screw 35, so that the helical path 37 drives the ball 38 along the transfer groove.

Such a groove arrangement has inventive merit on its own, and may also be used advantageously in any coupling piece with which the monitor arm in use is swivably coupled to the post of the monitor arm stand at a set position P on the longitudinal axis A, the coupling piece being provided with a monitor arm interface that in use bearing mounts the monitor arm to turn on the longitudinal axis A of the post at the set position P, in which the monitor arm interface is provided with a groove arrangement. Such groove arrangement may include an upper circumferential groove, a lower circumferential groove, the grooves being of different circumferential lengths, and a ball 38 that may cooperate with either groove so as to define different length limited angular swivel paths of the arm on the post between the ends of each groove. As an alternative or in addition, the groove arrangement may include a helical groove, e.g. to define an angular swivel path of the arm on the post of 360 degrees or less. In such case, one or more screws 35 held in the recess 36 may be used to set limited travel of the ball 38, and hence provide an adjustable swivel path of the arm.

Figure 4:
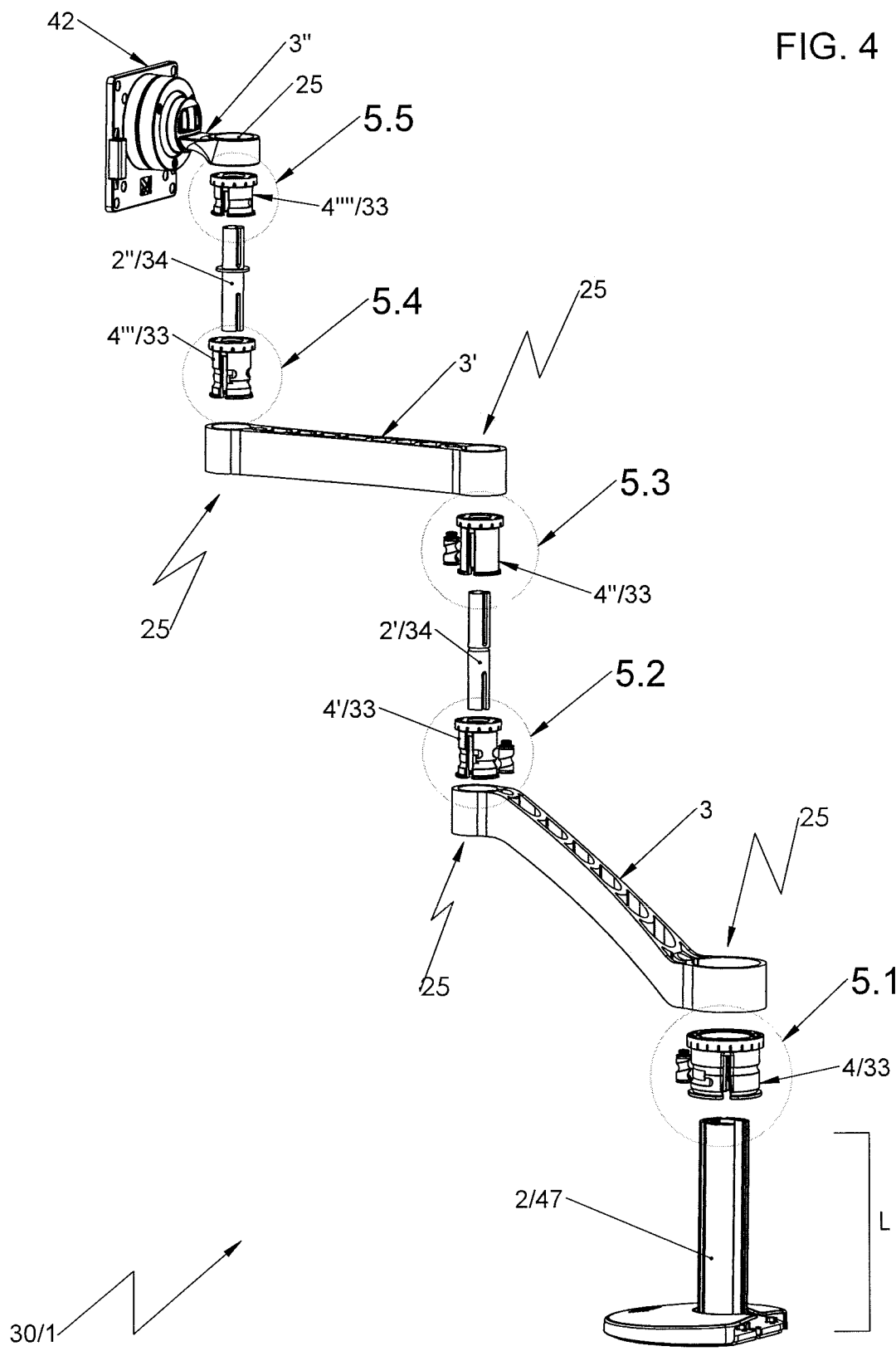
FIG. 4 shows a schematic perspective exploded view of a monitor arm stand according to the invention, and FIGS. 5.1-5.5 show details of FIG. 4 on an enlarged scale.

Referring to FIG. 4 and FIGS. 5.1-5.5, an articulated monitor arm stand 30/1 is shown that includes three monitor arms 3, 3', 3" and three posts 2, 2', 2" and five coupling pieces 4,4',4", 4''', 4'''' in accordance with the invention. The monitor arms are each formed as an extruded, aluminum profile. The profiles each have extruded mounting apertures 25 at the monitor arm ends of which the inner surfaces 26 are un-machined. In each mounting aperture 25, a coupling piece 4 formed as a coupling unit 33 of the type shown in FIG. 3 is mounted. As shall be noted from FIG. 5.2 and FIG. 5.3 the coupling pieces 4 are reversible top-to-bottom: they can be used in either upright or upside down orientation. Each coupling piece 4 is manufactured from injection-moulded components out of a plastics material. Each coupling piece 4 is coupled to a post 2 at a set position P, and is clamped between the post 2 and the monitor arm 3 via its post interface 5 and its monitor arm interface 6 respectively through adjustment of its screw ring 19. The first post 2 is embodied as a column 47, and includes a mounting track 31 of which the length along the longitudinal direction is more than three times the dimension of the post interface 5 in the longitudinal direction of the column 47. This way, the first arm may be set at a desired axial position on the mounting track 31 along the longitudinal axis A of the column 47. The second and third posts 2', 2" are embodied as connecting posts 34, of which the length of the longitudinal axis A is about twice the dimension of the post interface 5 in the longitudinal direction of the post 2. The fifth coupling piece 4'''' carries a monitor mounting plate 42 for coupling a flat panel display monitor to the end of the monitor arm 3. The coupling pieces 4 may prevent sagging of the arms, and may be cooperated in a tool-less manner. This modular construction allows simple and reconfiguration of the monitor arm stand 1 using standardized components. For example, the monitor arm stand 1 may easily be reconfigured from a non-articulated monitor arm to an articulated arm by adding a connecting post 34 and a further monitor arm. Also, the monitor arm stand 1 may be reconfigured from a single arm configuration to a single post dual arm configuration by leaving the first monitor arm in place, and positioning a second monitor arm above it on the column 47 or pillar post.

It should be noted that the post interface of the coupling piece that in use rotationally fixedly engages the post may in practice be locked against rotation relative to the post, or may be provided with limited rotational movement relative to the post. Such limited rotational movement may e.g. be only a few degrees of rotation, in particular up to 5° or 10° due e.g. to manufacturing tolerances or play resulting from assembly or wear. Such limited rotational movement may also include a stroke of free angular movement of e.g. more than 10°, e.g. 20°, 30°, or 60°, but less than a full revolution of 360°. In particular in cases in which the post is not embodied as a column, and e.g. prevention of sag is less stringent, such limited rotational movement may well be acceptable, or even desirable. For example, the limited rotational movement may be useful to provide a rotational stroke at the post interface as part of the swivel path of the arm about the post. This may e.g. be done elegantly by making the groove in the post oversized in circumferential direction relative to the radially inwardly extending projection of the coupling piece.

Also it should be noted that the coupling piece may be used to connect arms with other posts than posts of a monitor arm stand. The coupling piece in use is swivably coupled to the post at a set position on the longitudinal axis, and the coupling piece is provided with a post interface that in use rotationally fixedly engages the post, and an arm interface that in use bearing mounts the arm to swivel about the longitudinal axis of the post at the set position.

The invention is not limited to the exemplary embodiments represented here, but include variations. Such variations shall be clear to the skilled person and are considered to fall within the scope of the invention as defined in the appended claims.

LIST OF REFERENCE SIGNS 1. monitor arm stand
2. post
3. monitor arm
4. coupling piece
5. post interface of the coupling piece
6. monitor arm interface of the coupling piece
7. conical wedge surface of the coupling piece
8. radially inwardly extending projections
9. grooves in the mantle surface of the post
10. one-piece bushing
11. cylindrical inner mantle surface of the coupling piece
12. outer mantle surface of the coupling piece
13. conical wedged bearing surface
14. radially inwardly disposed inner coupling bushing part
15. radially outwardly disposed outer coupling bushing part
16. radial outer face of the inner coupling bushing part
17. radial inner face of the outer coupling bushing part
18. cooperating wedge surfaces
19. screw ring
20. screw thread on inner surface screw ring
21. screw thread on radial outer surface of inner coupling bushing part
22. radially inwardly extending locking ridge of outer coupling bushing part
23. mantle surface of the post
24. longitudinally extending slot in mantle surface of the post
25. mounting aperture of the monitor arm
26. cylindrical inner surface of mounting aperture
27. radial cylindrical outer surface of outer coupling bushing part
28. bearing mounting monitor arm interface
29. cylindrical contact rings
30. articulated monitor arm stand
31. mounting track
32. monitor
33. coupling unit
34. post embodied as coupling post
35. screw
36. recess
37. helical path
38. ball
39. upper long circumferential groove
40. lower short circumferential groove
41. axial transfer groove 42. monitor mounting plate
43. flange
44. radial locking ridge (not used)
45. flange
46. groove
47. post that is embodied as column
A longitudinal axis
& curl
D distance
L length of mounting track
P set position
X cross
I clamping use position
II release position

The invention claimed is:

1. A monitor arm stand, comprising a post that extends along a longitudinal axis, a monitor arm for supporting a monitor radially outward relative to the longitudinal axis of the post, and a coupling piece with which the monitor arm in use is swivably coupled to the post at a set position on the longitudinal axis, the coupling piece being provided with a radially inwardly disposed post interface that in use rotationally fixedly engages the post, and a radially outwardly disposed monitor arm interface that surrounds the radially inwardly disposed post interface, and that in use bearing mounts the monitor arm to turn on the longitudinal axis of the post at the set position.

2. The monitor arm stand according to claim 1, in which the coupling piece in use is clamped between the post and the monitor arm via the post interface and the monitor arm interface respectively.

3. The monitor arm stand according to claim 1, in which the coupling piece is operable between a clamping use position in which the monitor arm is clamped onto the post via the coupling piece, and a releasing position in which the monitor arm is not clamped onto the post via the coupling piece.

4. The monitor arm stand according to claim 3, in which at least a portion of the coupling piece is movable along the longitudinal axis of the post relative to the post or the monitor arm to adjust the coupling piece between the clamping use position and the releasing position.

5. The monitor arm stand according to claim 3, in which the coupling piece comprises a wedge surface that transposes axial movement of at least a portion of the coupling piece along the longitudinal axis of the post relative to the post or monitor arm between the clamping use position and the releasing position into a radial operating movement of the coupling piece relative to the post or monitor arm.

6. A monitor arm stand, comprising a post that extends along a longitudinal axis, a monitor arm for supporting a monitor radially outward relative to the longitudinal axis of the post, and a coupling piece with which the monitor arm in use is swivably coupled to the post at a set position on the longitudinal axis, the coupling piece being provided with a post interface that in use rotationally fixedly engages the post, and a monitor arm interface that in use bearing mounts the monitor arm to turn on the longitudinal axis of the post at the set position in which the post is a column that includes a mounting track which extends along the longitudinal axis of the column.

7. The monitor arm stand according to claim 1, in which the coupling piece comprises a coupling bushing arranged between the post and the monitor arm.

8. The monitor arm stand according to claim 7, in which a radial inner mantle surface of the coupling bushing comprises the post interface, and in which a radial outer mantle surface of the coupling bushing comprises the monitor arm interface.

9. A monitor arm stand, comprising a post that extends along a longitudinal axis, a monitor arm for supporting a monitor radially outward relative to the longitudinal axis of the post, and a coupling piece with which the monitor arm in use is swivably coupled to the post at a set position on the longitudinal axis, the coupling piece being provided with a post interface that in use rotationally fixedly engages the post, and a monitor arm interface that in use bearing mounts the monitor arm to turn on the longitudinal axis of the post at the set position, in which the coupling piece comprises a coupling bushing arranged between the post and the monitor arm and in which the coupling bushing comprises a radially inwardly disposed inner coupling bushing part that comprises the post interface, and a radially outwardly disposed outer coupling bushing part that surrounds the inner coupling bushing part, and that comprises the monitor arm interface, and in which the radial outer face of the inner coupling bushing part and the radial inner face of the outer coupling bushing part cooperate with each other via wedge surfaces and wherein the radial inner face of the inner coupling bushing part comprises the post interface, and wherein the radial outer face of the of the outer coupling bushing comprises the monitor arm interface.

10. The monitor arm stand according to claim 9, in which the radial outer face of the inner coupling bushing part and the radial inner face of the outer coupling bushing part comprise sets of cooperating wedge surfaces that are interspaced along the longitudinal axis of the post.

11. A monitor arm stand, comprising a post that extends along a longitudinal axis, a monitor arm for supporting a monitor radially outward relative to the longitudinal axis of the post, and a coupling piece with which the monitor arm in use is swivably coupled to the post at a set position on the longitudinal axis, the coupling piece being provided with a post interface that in use rotationally fixedly engages the post, and a monitor arm interface that in use bearing mounts the monitor arm to turn on the longitudinal axis of the post at the set position, in which the coupling piece comprises a coupling bushing arranged between the post and the monitor arm and in which the coupling bushing comprises a radially inwardly extending locking ridge that reaches into a slot in a mantle surface of the post that extends along the longitudinal axis of the post.

12. The monitor arm stand according to claim 1, in which the monitor arm is provided with a mount, in which the coupling piece is in use held via its monitor arm interface.

13. The monitor arm stand according to claim 12, in which the monitor arm is an extruded profile, and in which the mount is formed by an un-machined, extruded aperture.

14. The monitor arm stand according to claim 12, in which the monitor arm further comprises a second mount at an opposite end of the monitor arm, in which, analogous to the first coupling piece, in use a second coupling piece is bearing mounted via its monitor arm interface, and rotationally fixedly engages a second post via its post interface at a set position along its longitudinal axis.

15. The monitor arm stand according to claim 14, in which, analogous to the first and second coupling pieces, in use a third coupling piece rotationally fixedly engages the second post via a post interface at another set position along the longitudinal axis of the second post.

16. The monitor arm stand according to claim 15, in which the third coupling piece in use via its monitor arm interface bearing mounts a second monitor arm to turn on the longitudinal axis of the second post at the further set position.

17. The monitor arm stand according to claim 1 in which the radially inwardly disposed post interface and the radially outwardly disposed monitor arm interface cooperate with each other.

18. The monitor arm stand according to claim 1 in which the coupling piece being provided with a radially inwardly disposed post interface that in use rotationally fixedly engages the post locks the coupling piece to the post against rotation relative to the post.

* * * * *